United States Patent [19]

Okada et al.

[11] Patent Number: 4,706,415

[45] Date of Patent: Nov. 17, 1987

[54] NUMERICAL CONTROL MACHINE TOOL WITH MANUAL FEED HANDLE

[75] Inventors: Hiroshi Okada, Ohbu; Toshio Tsujiuchi, Kariya; Tadashi Ogasawara, Toyoda, all of Japan

[73] Assignee: Toyoda Koki Kabushiki Kaisha, Kariya, Japan

[21] Appl. No.: 878,799

[22] Filed: Jun. 26, 1986

[30] Foreign Application Priority Data

Aug. 29, 1985 [JP] Japan ................................ 60-188601

[51] Int. Cl.⁴ .............................................. B24B 49/00
[52] U.S. Cl. ................................ 51/165 R; 51/165.71; 82/2 B; 82/29 B; 83/522
[58] Field of Search ...................... 82/2 B, 21 B, 29 B; 83/522; 51/165.71, 165.72, 165 TP, 165.9, 165 R

[56] References Cited

U.S. PATENT DOCUMENTS

| | | | |
|---|---|---|---|
| 2,741,882 | 4/1956 | Straw | 51/165.72 |
| 3,035,378 | 5/1962 | Lockwood | 51/165.9 |
| 3,221,578 | 12/1965 | Parsons | 82/21 B |
| 4,167,082 | 9/1979 | Kolb | 51/165.72 |
| 4,485,594 | 12/1984 | Guertin | 51/165.71 |

OTHER PUBLICATIONS

Toyoda's Product brochure for Model GUX 25 High Precision Universal Grinder, pp. 2 and 5.
Toyoda's Product brochure for Model GPN5 Series CNC Cylindrical Grinder, pp. 1, 2 and 14.

Primary Examiner—Harold D. Whitehead
Attorney, Agent, or Firm—Oblon, Fisher, Spivak, McClelland & Maier

[57] ABSTRACT

An operator's panel for a numerical controller of a grinding machine comprises a main frame of a generally box shape, which is carried on a front portion of a bed of the grinding machine for pivotal movement about a horizontal axis. A manual pulse generator for supplying the numerical controller with pulse signals is mounted in the main frame, and a manual feed handle is secured to an input shaft of the pulse generator. A mechanism is further provided for locking the main frame at such an angular position as desired by an operator of the grinding machine.

7 Claims, 3 Drawing Figures

NUMERICAL CONTROL MACHINE TOOL WITH MANUAL FEED HANDLE

BACKGROUND OF THE INVENTION

1. Field of the Invention

The present invention relates to a numerical control machine tool having a manual feed handle for operating a manual pulse generator.

2. Discussion of the Prior Art

Generally, computerized numerical controllers incorporating minicomputers or microcomputers therein are provided with operator's panels. The operators' panels are provided with manual pulse generators, feed rate overriding switches, and various other switches for enabling an operator to input manual feed pulses and various command signals to the numerical controllers.

In a known machine tool such as cylindrical grinding machine with a computerized numerical controller, an operator's panel for manipulation by an operator is practically located at a right upper side of the machine tool as viewed from the operator standing in front of the machine tool. Thus, unlike hydraulic feed type grinding machines and lathes, the numerical control machine tool is not provided with any manual feed handle at a front portion of a machine bed. This does not permit the operator to manipulate manual feed handles while standing in front of the machine tool where the machining status of a workpiece can be easily monitored, as in the case of the hydraulic feed type grinding machines. Therefore, working property is poor in manipulating feed handles for manual feeds of a work table and a grinding wheel carrier.

SUMMARY OF THE INVENTION

Accordingly, it is a primary object of the present invention to provide an improved numerical control machine tool such as, preferably, a cylindrical grinding machine wherein a operator's panel having at least one manual feed handle for operating a manual pulse generator can be tilted for easy manipulation by an operator who stands in front of the machine tool while monitoring a machining point between a tool and a workpiece.

Briefly, in a numerical control machine tool according to the present invention, an operator's panel for supplying a numerical controller with command signals is provided at a front portion of a machine bed. The operators' panel comprises a main frame of a generally box shape, which is carried at the front portion of the bed to be pivotable about a horizontal axis. A manual pulse generator which, when operated, generates feed pulses to the numerical controller is fixedly mounted in the main frame, and a manual feed handle for operating the pulse generator is secured to an input shaft of the pulse generator. A mechanism is further provided for locking the main frame at a desired pivotal position.

With this configuration, since the operator's panel is provided at the front portion of the machine bed, an operator is able to manipulate the manual feed handle, standing in front of the machine to monitor a machining operation performed by the machine tool. Further, since the operator's panel can be pivoted to an angular position as desired by the operator, the manipulation of the manual feed handle becomes easy.

BRIEF DESCRIPTION OF THE ACCOMPANYING DRAWINGS

Various other objects, features and many of the attendant advantages of the present invention will be readily appreciated as the same becomes better understood by reference to the following detailed description of a preferred embodiment when considered in connection with the accompanying drawings, wherein like reference numerals designate the same or corresponding parts throughout the several views, and in which.

DETAILED DESCRIPTION OF THE PREFERRED EMBODIMENT

Figure 1:
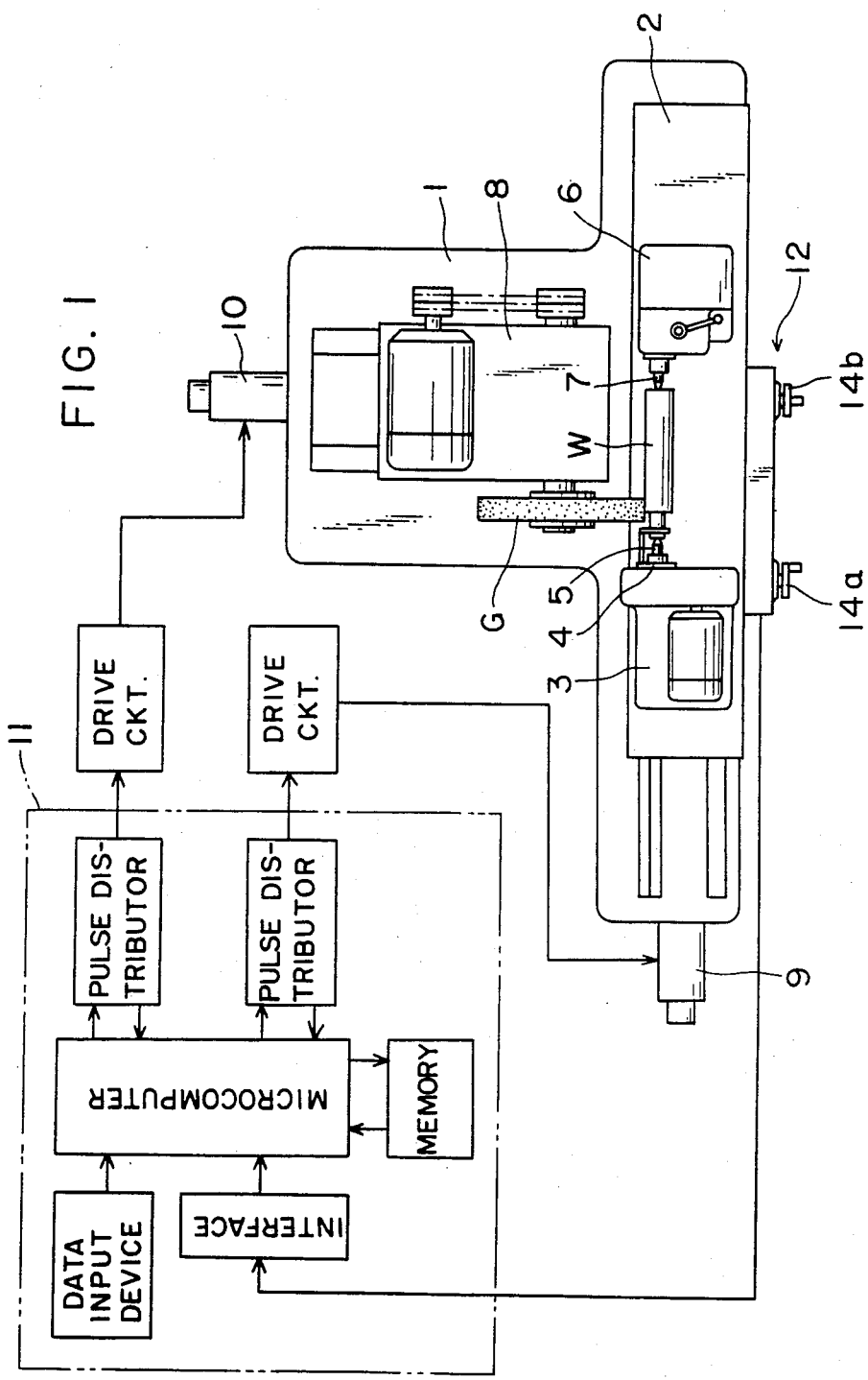
FIG. 1 is a plan view of a numerical control machine tool according to the present invention, also showing a block diagram of a computerized numerical controller connected to the machine tool.

Referring now to the drawings and particularly to FIG. 1 thereof, a reference numeral 1 denotes a bed of a numerical control grinding machine, 2 a table movable on the bed 1, 3 a work head mounted on the table 2, 4 a work spindle, and 5 a center received in the work spindle 4. A foot stock 6 is mounted on the table 2 and is provided with another center 7. A workpiece W is carried with its opposite ends being engaged with the centers 5 and 7 for rotation about an axis parallel with the moving direction of the table 2. A grinding wheel carrier 8 mounted on the bed 1 is movable in a direction transverse to the moving direction of the work table 2 and rotatably carries a grinding wheel 10. Servomotors 9 and 10 are provided for moving the table 2 and the wheel carrier 8, respectively. The servomotors 9 and 10 are controllable by a computerized numerical controller (hereafter referred to as "CNC") 11 which is well known in the art, in accordance with a numerical control program so as to automatically feed the table 2 and the wheel carrier 8.

Figure 2:
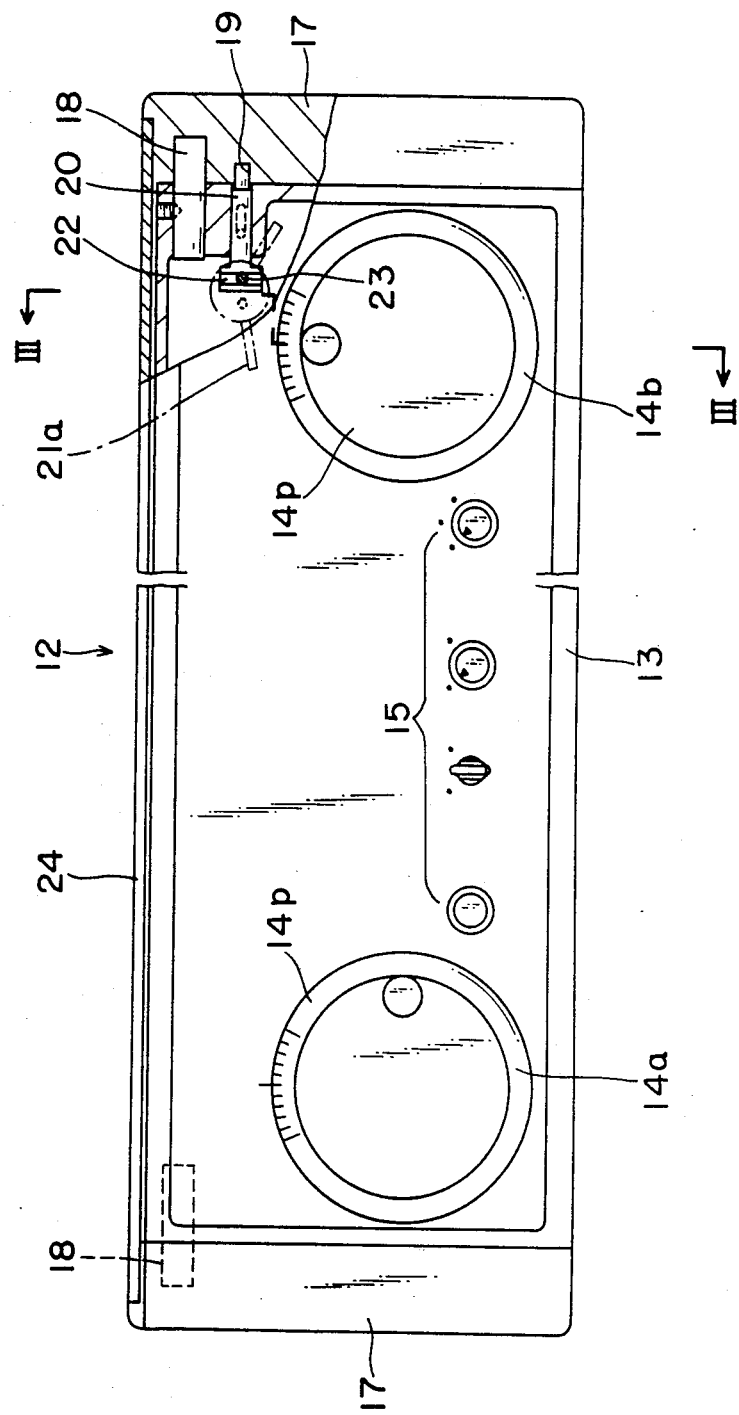
FIG. 2 is a front view, partly in section, of an operator's panel mounted at a front portion of a machine bed.
Figure 3:
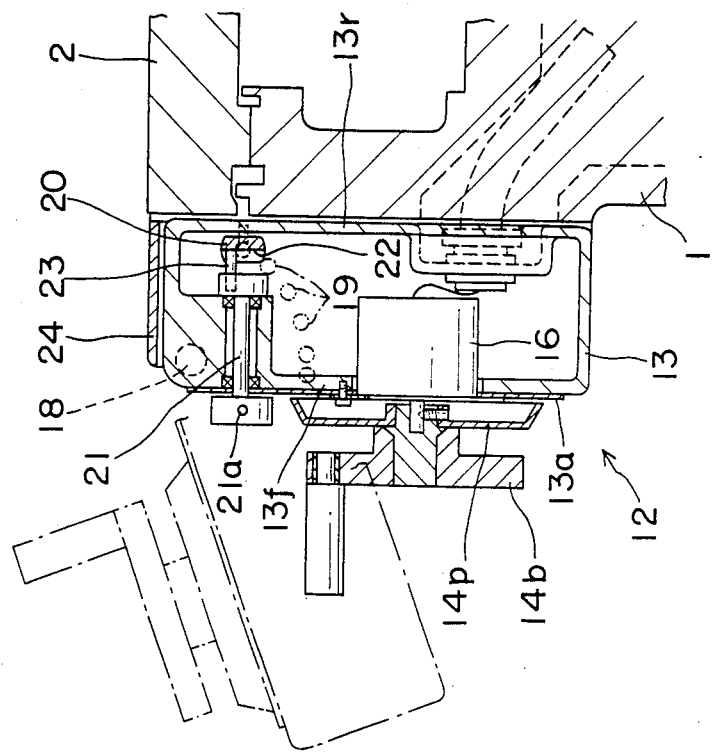
FIG. 3 is a sectional view of the operator's panel taken along the line III—III in FIG. 2.

The present invention features providing an operator's panel 12 for the CNC 11 at a front portion of the bed 1. Generally, in grinding machines of the illustrated type, the front portion of the bed 1 is defined as a portion which is close to the place where an operator usually stands for manipulation of the machine tool. The configuration of the operator's panel 12 will be described with reference to FIGS. 2 and 3.

The operator's panel 12 comprises a main frame 13 of a generally box shape which has a rear plate portion 13r facing the front flat surfaces of the bed 1 and the table 2 and a front plate portion 13f spaced from the rear plate portion 13r in parallel therewith. An ornamental thin plate 13a is secured to the front plate portion 13a. Various switches 15 of selector and push types which are necessary for function controls of the grinding machine, a manual table feed handle 14a and a manual wheel carrier feed handle 14b are provided on the front plate portion 13f and protrude from the ornamental plate 13a. Manual pulse generators 16 are mounted within the main frame 13, with their input shafts (not numbered) respectively carrying the handles 14a and 14b. As is well known in the art, when each of the handles 14a and 14b is rotated by the operator, a corresponding one of the pulse generators 16 outputs pulse signals to the CNC 11. The CNC 11, when in a manual feed mode, is responsive to the pulse signals from each pulse generator 16 to move one of the table 2 and the wheel carrier 8 corresponding to the handle as rotated.

The operator's panel 12 is mounted on the bed 1 to be pivotable to, and fixable at, a desired angular position. A mechanism for this purpose is constructed as follows:

A pair of support plates 17 are secured to the bed 1 with a space therebetween which corresponds to the width of the main frame 13 in the longitudinal direction of the table 2. The main frame 13 is located within the space and is pivotably carried by means of a pair of hinge pins 18 which horizontally extend in parallel to the longitudinal direction of the table 2. The hinge pins 18 are secured to upper portions of longitudinal opposite ends of the main frame 13 and project outer ends thereof for fitting in holes (not numbered) formed in the support plates 17, respectively. One of the support plates 17 is formed at its inner side with a plurality of pin holes 19 which are at a predetermined interval on an arcuate curve having its center on the axis of the hinge pins 18. A locking pin 20 is axially movably carried by the main frame 13 in parallel relation with the hinge pins 18 for selective fitting into the pin holes 19. Consequently, the operator's panel 12 can be positioned at a vertical home position as indicated by the solid line in FIG. 3 as well as at a number of tilted positions which are angularly displaced from the home position. The operator's panel 12 at the home position horizontally orients the axes of the manual feed handles 14a, 14b. However, at any one of the tilted positions, the operator's panel 12 orients the axes of the manual feed handles 14a, 14b in an upwardly inclined direction for easy manipulation of the feed handles 14a, 14b as well as for easy reading of graduations given on a plate 14p which is rotatable bodily with each feed handle 14a, 14b.

A lever shaft 21 which has a lever 21a projecting from the ornamental plate 13a is pivotably carried in the main frame 13 for axially moving the locking pin 20 to and from a selected one of the pin holes 19. For connection of the lever shaft 21 with the locking pin 20, a groove 22 is formed in the locking pin 20 perpendicularly to the axis thereof, and a small crank pin 23 which eccentrically protrudes from the rear end of the lever shaft 21 is engaged with the groove 22. Thus, the pivotal movement of the crank pin 23 is translated into the axial movement of the locking pin 20. A reference numeral 24 designates a top plate, which is secured to the support plates 17 for covering the top of the operator's panel 12.

OPERATION

In order to supply the CNC 11 with command signals, the operator's panel 12 is manipulated by the operator. In such manipulation, the operator's panel 12 is pivoted to such an angular position as to be easy for the operator to manipulate and is fixed at such an angular position. For this angular adjustment, the lever shaft 21 is pivoted to retract the locking pin 20 to thereby disengage the same from one of the pin holes 19. Thus, the operator's panel 12 becomes freely pivotable. Then, the operator's panel 12 is manually turned to a desired angular position, and the lever shaft 21 is adversely pivoted to insert the locking pin 20 into another pin hole 19, whereby the operator's panel 12 can be fixed again at the desired angular position. When any of the feed handles 14a and 14b is manually rotated, the corresponding pulse generator 16 generates pulse signals to the CNC 11. The CNC 11, when in a manual feed mode, responds to the pulse signals to drive a corresponding one of the servomotors 9 and 10, whereby feed movement is imparted to the table 2 or the wheel carrier 8 mechanically connected to the driven servomotor 9 or 10.

It is to be noted that the present invention may be applied not only to the grinding machine as described above, but also to various other types of machine tools including lathes. Particularly, the present invention is advantageous when used in those wherein machinings are effected on a cylindrical workpiece rotating about its longitudinal axis, as is the case of cylindrical grinding machines and lathes.

Obviously, numerous modifications and variations of the present invention are possible in light of the above teachings. It is therefore to be understood that within the scope of the appended claims, the present invention may be practiced otherwise than as specifically described herein.

What is claimed is:

1. A numerical control machine tool having a bed, a workpiece carrier movable on said bed in first horizontal direction, a tool carrier movable on said bed in a second horizontal direction across said first horizontal direction, first and second servomotors for respectively moving said workpiece carrier and said tool carrier on said bed, a numerical controller for controlling the operations of said first and second sermomotors in accordance with a numerical control program, and an operator's panel manually operable for supplying said numerical controller with command signals, said operator's panel comprising:
   a main frame of a generally box shape;
   pulse generator means fixedly mounted in said main frame and having input shaft means rotatable for generating pulse signals to be input to said numerical controller;
   manual feed handle means secured to said input shaft means of said pulse generator means for rotating said input shaft means;
   support means provided on a front portion of said bed located at the side which is opposite to said tool carrier through said workpiece carrier therebetween, for supporting said main frame pivotably about an axis extending in and parallel to said first horizontal direction and above and at a 90° angle to said input shaft so that said main frame is pivotable from a home position where said input shaft means of said pulse generator means is horizontally oriented, to any one of tilted positions where said input shaft means of said pulse generator means is oriented inclined upwardly; and
   locking means manually operable for fixing said main frame at any one of said home position and said titled positions.

2. A numerical control machine tool a set forth in claim 1, wherein said support means includes:
   a pair of support plates fixed on said front portion of said bed and respectively facing longitudinal opposite end surfaces of said main frame; and
   hinge pin means horizontally carried by said pair of support plates for enabling said main frame to be pivoted from said home position to any one of said tilted positions.

3. A numerical control machine tool as set forth in claim 1, wherein:

said pulse generator means includes first and second pulse generators respectively having as said input shaft means first and second input shafts each rotatable for generating pulse signals to be input to said numerical controller so as to drive a corresponding one of said first and second servomotors; and said manual feed handle means includes first and second manual feed handles respectively secured to said first and second input shafts of said first and second pulse generators;

said first and second pulse generators being disposed at opposite end portions of said main frame in the axial direction of said workpiece on said workpiece carrier so that said first and second manual feed handles are sufficiently spaced.

4. A numerical control machine tool having a bed, a workpiece carrier on said bed for carrying a cylindrical workpiece rotatably about a horizontal axis, a tool carrier on said bed for carrying a grinding wheel, a first servomotor for moving said workpiece carrier in an axial direction of said workpiece, a second servomotor for horizontally moving said tool carrier so as to move said grinding wheel toward and away from said workpiece on said workpiece carrier, a numerical controller for controlling the operations of said first and second servomotors in accordance with a numerical control program, and an operator's panel manually operable for supplying said numerical controller with command signals, said operator's panel comprising:

a main frame of a generally box shape;

first and second pulse generator fixedly mounted in said main frame and respectively having input shafts each rotatable for generating pulse signals to be input to said numerical controller;

first and second manual feed handles respectively secured to said input shafts of said first and second pulse generator for rotating said input shaft means;

support means provided on a front portion of said bed located at the side which is opposite to said tool carrier through said workpiece carrier therebetween, for supporting said main frame pivotably about an axis extending in and parallel with said horizontal axis and above and at a 90° to said input shafts so that said main frame is pivotable from a home position where said input shafts of said first and second pulse generators are horizontally oriented, to any one of tilted positions where said input shafts of said first and second pulse generators are oriented inclined upwardly; and locking means manually operable for fixing said main frame at any one of said home position and said titled positions.

5. A numerical control machine tool as set forth in claim 4, wherein said support means includes:

a pair of support plates fixed on said front portion of said bed and spaced in a moving direction of said workpiece carrier for respectively facing longitudinal opposite end surfaces of said main frame; and hinge pin means horizontally carried by said pair of support plates for enabling said main frame to be pivoted from said home position to any one of said tilted positions.

6. A numerical control machine tool as set forth in claim 5, wherein said locking means comprises:

a locking pin carried by said main frame to be axially movable in a direction parallel to the axis of said hinge pin means and insetable in any one of pin holes formed in one of said support plates;

a shaft carried by said main frame to be manually pivotable about an axis parallel with said first and second input shafts of said first and second pulse generators; and motion translation means for translating pivot movement of said shaft into axial movement of said locking pin.

7. A numerical control machine tool as set forth in claim 4, wherein said first and second pulse generators are disposed at opposite end portions of said main frame in the axial direction of said workpiece on said workpiece carrier so that said first and second manual feed handles are sufficiently spaced.

* * * * *